(12) United States Patent
Sztybel (10) Patent No.: US 7,567,846 B2
(45) Date of Patent: Jul. 28, 2009

(54) INTERACTIVE AUDIO CONTENT DELIVERY SYSTEM AND METHOD

(76) Inventor: Robert S. Sztybel, 15 Stewart Pl., Penthouse 12G, White Plains, NY (US) 10603

( * ) Notice: Subject to any disclaimer, the term of this patent is extended or adjusted under 35 U.S.C. 154(b) by 553 days.

(21) Appl. No.: 10/949,514

(22) Filed: Sep. 24, 2004

(65) Prior Publication Data

US 2006/0085521 A1    Apr. 20, 2006

(51) Int. Cl.
*G06F 17/00* (2006.01)
*H04M 11/00* (2006.01)
*H04M 1/57* (2006.01)

(52) U.S. Cl. .................. 700/94; 379/88.13; 379/101.01; 379/142.06

(58) Field of Classification Search .............. 700/94; 725/34, 99; 379/101.01, 67.1, 88.18, 88.25, 379/88.02, 88.13, 114.13, 201.02, 201.03, 379/201.05, 142.06; 340/825.24; 455/414.3
See application file for complete search history.

(56) References Cited

U.S. PATENT DOCUMENTS

| | | | |
|---|---|---|---|
| 4,899,369 A * | 2/1990 | Kondziela | 379/101.01 |
| 5,440,620 A * | 8/1995 | Slusky | 379/100.07 |
| 5,793,980 A | 8/1998 | Glaser et al. | |
| 5,892,536 A * | 4/1999 | Logan et al. | 725/34 |
| 5,918,213 A * | 6/1999 | Bernard et al. | 705/26 |
| 5,931,901 A * | 8/1999 | Wolfe et al. | 709/206 |
| 5,963,916 A | 10/1999 | Kaplan | |
| 6,151,634 A | 11/2000 | Glaser et al. | |
| 6,278,976 B1 * | 8/2001 | Kochian | 704/500 |
| 6,529,584 B1 * | 3/2003 | Ravago et al. | 379/67.1 |
| 6,529,586 B1 * | 3/2003 | Elvins et al. | 379/88.13 |
| 6,718,015 B1 * | 4/2004 | Berstis | 379/88.13 |
| 6,775,358 B1 * | 8/2004 | Breitenbach et al. | 379/88.13 |
| 6,801,850 B1 * | 10/2004 | Wolfson | 701/209 |
| 7,039,933 B1 * | 5/2006 | Chen et al. | 725/36 |
| 2001/0049641 A1 * | 12/2001 | Nakamura et al. | 705/26 |
| 2002/0120506 A1 * | 8/2002 | Hagen | 705/14 |
| 2002/0178257 A1 * | 11/2002 | Cerrato | 709/224 |
| 2006/0027077 A1 * | 2/2006 | Ikeda et al. | 84/600 |
| 2006/0080103 A1 * | 4/2006 | Van Breemen | 704/270 |

OTHER PUBLICATIONS

Hosea et al., U.S. Appl. No. 09/558,755, (incorporated by reference in US 2002/0178257), filed Apr. 21, 2000, p. 19.*

* cited by examiner

*Primary Examiner*—Curtis Kuntz
*Assistant Examiner*—Daniel R Sellers
(74) *Attorney, Agent, or Firm*—MacCord Mason PLLC (57) ABSTRACT

The present invention provides a system and method for delivering programmable, personalized interactive audio content, including advertising, via telecommunications carriers. Also, a telecommunications-carrier-based interactive combined entertainment, advertising, and sales channel is provided.

10 Claims, 4 Drawing Sheets

INTERACTIVE AUDIO CONTENT DELIVERY SYSTEM AND METHOD

BACKGROUND OF THE INVENTION (1) Field of the Invention

The present invention relates generally to on-demand, interactive content delivery and, more particularly, to an audio content delivery network systems and methods.

(2) Description of the Prior Art

Typically, audio content delivery systems and methods have utilized two methods of content delivery. The first method is delivery or transmission of an audio signal to an access device or receiver, such as a radio, without allowing the user to interact with the content provider via the access device. Current terrestrial, satellite and forthcoming digital radio services all follow this delivery model. The second method includes delivering and storing a digital audio file to a computer, thereby allowing the user to interact with the content stored on the computer. A third method, called streaming, delivers a digital audio signal to a computer as well, but does not use the computer to store the signal, nor does it allow the user to interact with the content; rather, it uses the computer as a digital radio to receive a widely broadcast program. Notably, prior art methods such as radios only provide for transmission of content from a broadcasting station that is received by the radio; the radio device associated with the user does not provide for any interactivity or transmission by the user's receiving device back to the source of the broadcast. Although a specific programming frequency or program stream can be selected, the first and third methods, by not allowing the user to interact, does not allow the user to precisely select, schedule, customize nor navigate content nor interact with the content provider for other motives. The second and third methods require the user invest in a computer or other suitable access device and install appropriate software to receive digital versions of requested content. The digital content is translated into audio and video locally, on the user's access device. This delivery method is accompanied by digital rights management (DRM) issues that limit what a listener can access. Thus, a need exists for a DRM-compliant system that allows the user to program, select and navigate personalized content and interact with the content provider without requiring new equipment or software investment.

Prior art includes the following three issued US patents:

U.S. Pat. No. 6,151,634 issued to Glaser, et al. Nov. 21, 2000 and U.S. Pat. No. 5,793,980 issued to Glaser, et al. Aug. 11, 1998 for an Audio-on-demand communication system. The described audio-on-demand communication system provides real-time playback of digital audio data transferred via telephone lines or other communication links. One or more audio servers include memory banks which store compressed digital audio data. At the request of a user at a subscriber PC, an audio server transmits the compressed digital audio data over the communication link to the subscriber PC. The subscriber PC receives and decompresses the transmitted digital audio data in less than real-time using only the processing power of the CPU within the subscriber PC. Because the digital data is transferred to the access device, there is a concern among content licensors (e.g. RIAA) that this data can be utilized to pirate the content once downloaded.

U.S. Pat. No. 5,963,916 issued to Kaplan Oct. 5, 1999 for a Network apparatus and method for preview of music products and compilation of market data. The invention provides a system for on-line user-interactive multimedia based point-of-preview. The system provides for a network web site and accompanying software and hardware for allowing users to access the web site over a network such as the Internet via a computer. The user is uniquely identified to the web site server through an identification name or number. The hardware associated with the web site includes digital storage of discrete increments of pre-selected portions of music products for user selection and preview. After user selection, a programmable data processor selects the particular pre-recorded music product from data storage and then transmits that chosen music product in digital format over the network to the user for preview. Subscriber selection and profile data (i.e. demographic information) can optionally be collected and stored to develop market research data. Since the system provides for multiple embodiments, the system contemplates previewing of audio programs such as music on compact discs, video programs such as movies and text from books and other written documents. Furthermore, it is contemplated that the network web site can be accessed from a publicly accessible kiosk, available, e.g. at a retail store location, or from a desktop computer. Translation of the digital information would happen at these end-user devices. The invention presents itself as a preview mechanism so as to circumvent concerns about the downloading of digital content to the access device. Nevertheless, the problem is still inherent to this invention.

SUMMARY OF THE INVENTION

The present invention is directed to a content delivery system for delivering programmable, customized, interactive content to at least one user at any time of their choosing. Preferably, the system delivers the audio content via communications carriers. In a preferred embodiment of the present invention, the system provides for delivery of audio content via communications delivery systems, networks, and/or devices appropriate for the content and for the available technology in a given place and time.

Also, in a preferred embodiment, telephonic systems are used for audio content delivery for personalized, on-demand audio content for a particular user associated with his/her telephone, either wired or wireless.

The present invention is further directed to a method for doing business using a telephone-based audio content delivery system, the method steps including providing an audio content delivery system via telephone carriers and providing interactive advertisement to the at least one user of the access device.

Preferably, the method includes the steps of creating an associated user profile for the at least one user based on user preferences and navigation data collected during the delivery of content; providing interactive advertisement to the at least one user based on the associated user profile using an expert content management service; and providing acquisition transaction ability to the user through the device.

Thus, the present invention provides a system and method for delivering individualized, programmable, interactive, personalized audio content, including advertising, via telecommunications carriers, to at least one user utilizing any suitably equipped device.

Accordingly, one aspect of the present invention is to provide an audio content delivery system, including a network with at least one carrier, at least one network access device equipped with audio capability for receiving an audio content from the network through the carrier and an interface that permits the user to interact with the content source; at least one user; and at least one content source. The at least one network access device and at least one content source are connectable via the network, the system is accessible by the user using the at least one access device, and the system provides the interface for interactivity between the at least one user and the at least one content source, thereby providing an interactive audio entertainment system.

Another aspect of the present invention is to provide a method for doing business using an audio content delivery system, the method steps including providing an audio content delivery system according to the present invention and providing interactive advertisement to the at least one user of the access device. Preferably, the method also includes the steps of creating an associated user profile for the at least one user based on user preferences and accumulated navigation data; providing interactive advertisement to the at least one user based on the associated user profile using an expert content management service; and providing acquisition transaction ability to the user through the device.

These and other aspects of the present invention will become apparent to those skilled in the art after a reading of the following description of the preferred embodiment when considered with the drawings.

DETAILED DESCRIPTION OF THE PREFERRED EMBODIMENTS

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto.

The present invention provides a system and method for delivering programmable, personalized interactive, audio and/or video content, including advertising, music, movies, show rebroadcasts, spoken-word books, contests, and the like, and combinations thereof via telecommunications carriers. Preferably, a personal communications device, such as, by way of example and not limitation, wired or wireless telephone, personal data assistant (PDA), or other compact, portable communications-capable device or appliance, is employed for transmitting and receiving information from at least one content delivery source via the system.

I. Audio Content Delivery System & Method

Figure 1:
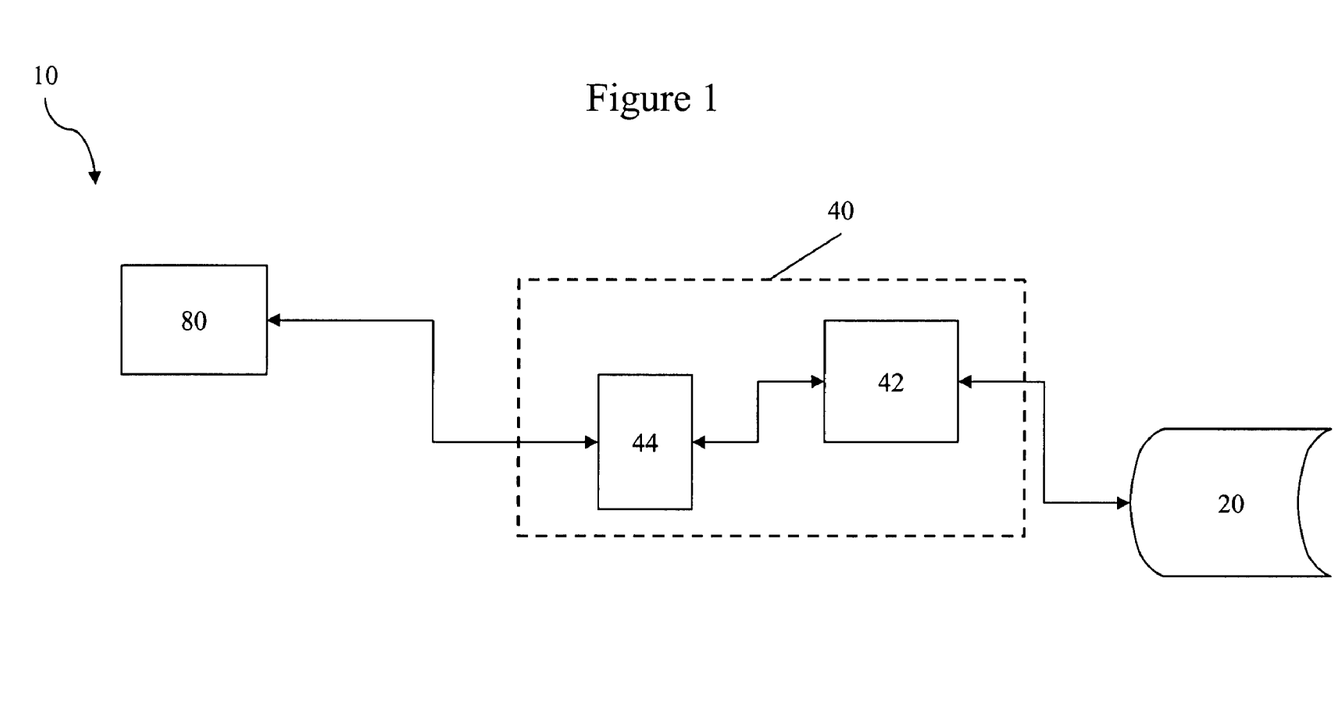
FIG. 1 is a diagrammatic view of a system according to the present invention.
Figure 2:
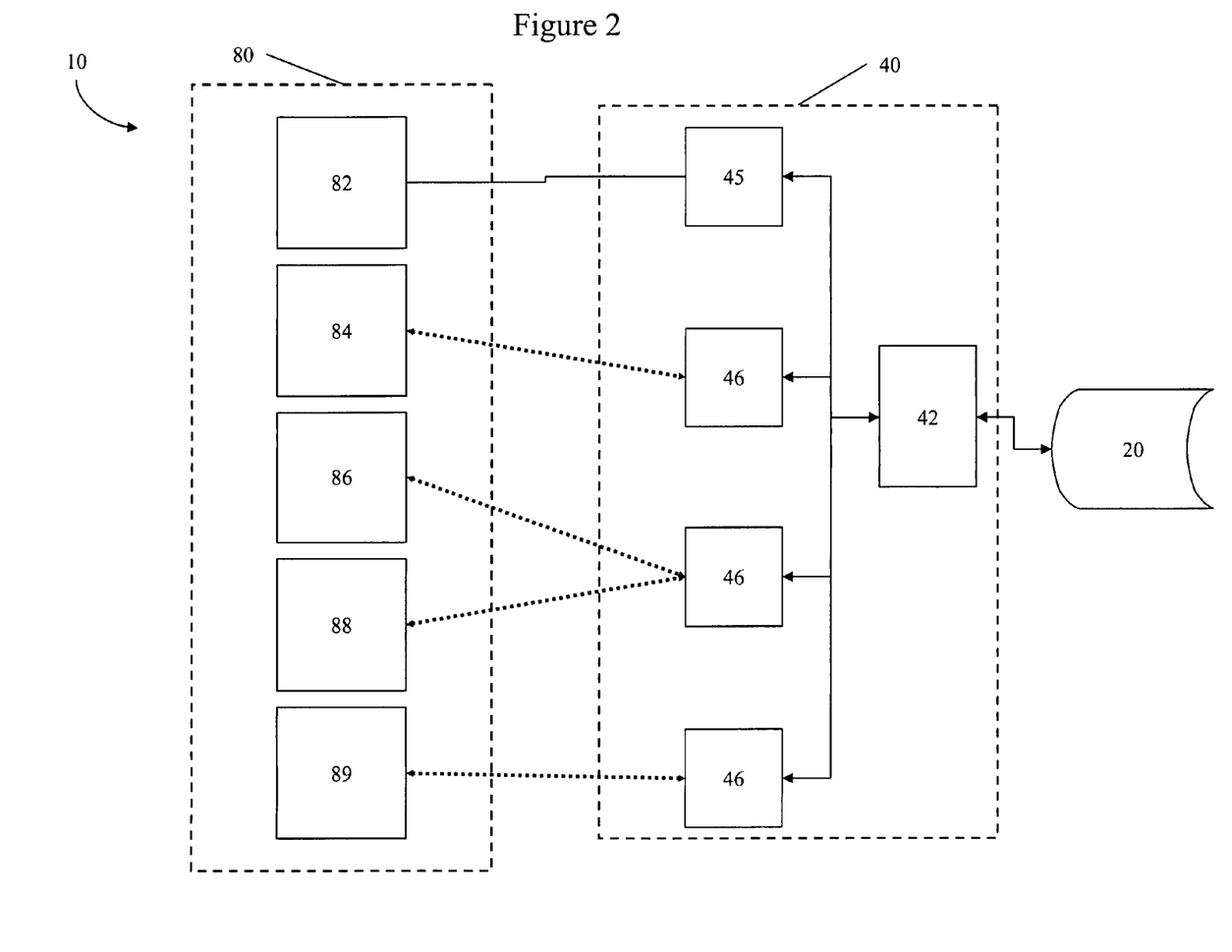
FIG. 2 is another diagrammatic view of an alternative embodiment of the present invention.
Figure 3:
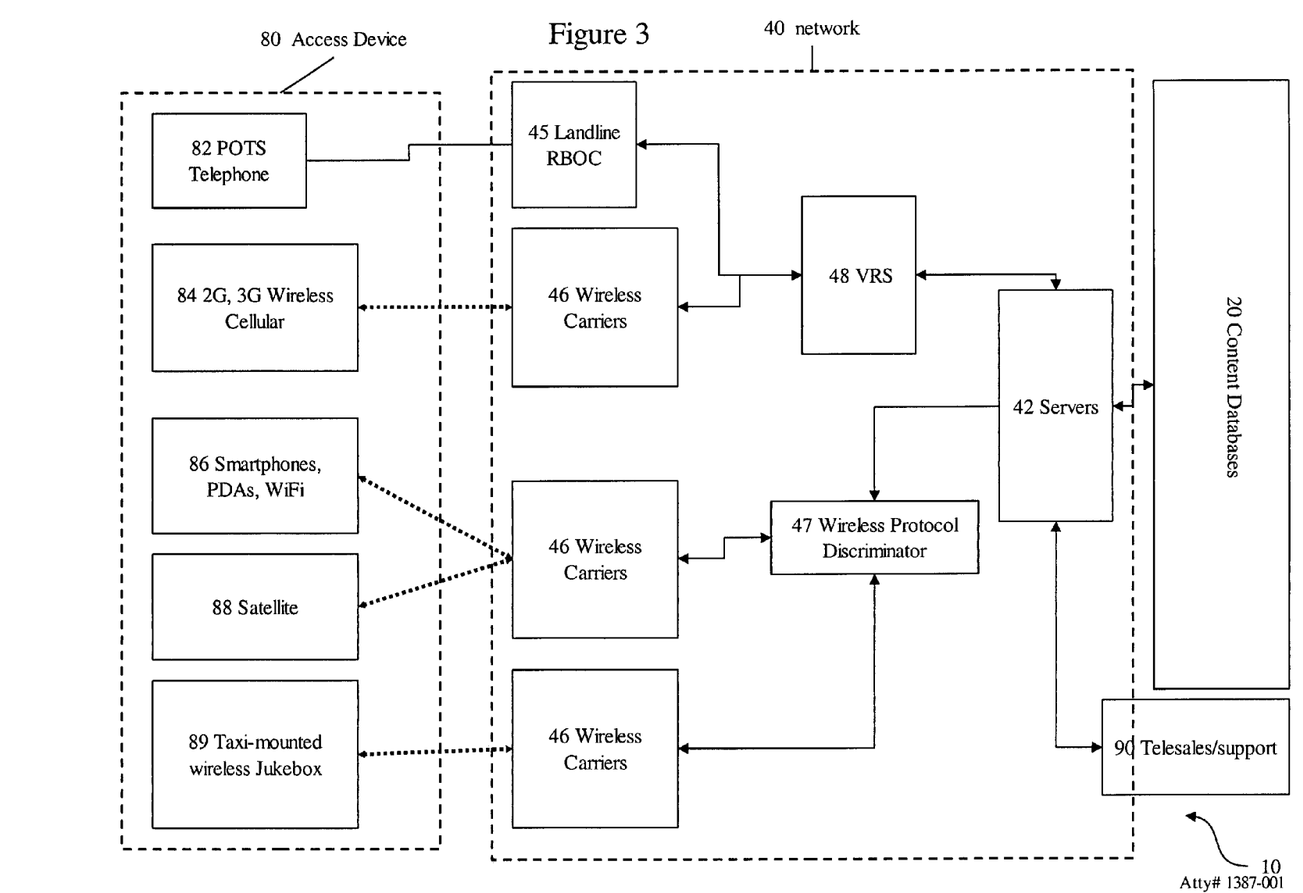
FIG. 3 is another diagrammatic view of an alternative embodiment of the present invention.

The present invention includes an audio content delivery system and method, generally described as 10 in FIGS. 1, 2 and 3. The system includes a network 40 in communication with at least one content source 20 and at least one access device 80. A user using the access device 80 can access the system. The system also provides for interactivity between the at least one user and the content source. The content source includes content databases, by way of example and not limitation, radio show rebroadcasts, audio book libraries, digital music libraries, advertisements, news, traffic information, weather, sports, and combinations thereof.

The present invention includes at least one network 40 that preferably includes at least one server 42 in communication at least one carrier 44. The server is also in communication with the at least one content source 20 and provides via the carrier the interface for the user to interact with the content source. The server contains the listener profile database and intelligent agent logic to drive the system.

The network can include multiple carriers. For example, the carriers can be landline carriers 45, wireless carriers 46, and the like, and combinations thereof. The landline carriers include such examples as regional bell operating companies and other incumbent local exchange carriers. The wireless carriers, for example, include those transmitting over such frequencies as cellular, digital cellular and PCS and using such protocols as AMPS, FDMA, TDMA, GSM; CDMA, its variants and other spread spectrum technologies; iDEN, CDPD, WAP, Docomo/I-mode, WiFi, satellite, radio frequency (RF), developing 3G technologies, and combinations thereof. Access may be via conventional phones 82 or smart phones 86 with web-browsing capability and running such local software platforms such as J2MEE, BREW, equivalents and successors. It is noted that this is not intended to be an exhaustive list, but an exemplary listing of present-day protocols and platforms at the time of the filing of the present invention Technology does not require use of a new device, it instead adapts existing devices to work seamlessly with the system. Existing communications devices used according to the present invention include wired or wireless telephones, PDAs, HPCs and the like. The device or appliance is essentially converted from its ordinary function into a content jukebox device by using the existing and/or using an enhanced user interface, such as keypads, voice, gesture or touchscreen, to interface via a network, such as the Internet, to access the at least one content source for providing selective delivery of content to the user via the device or appliance.

When using multiple carriers, the system preferably includes a protocol discriminator 47 that discriminates between such aforementioned wireless protocols and platforms to determine and select the optimal interface for the user based upon the specific access device in-use.

The system is thus carrier-independent, that is, access is not limited to a particular carrier or a particular device. Significantly, the present invention provides flexibility of access, since access by the user to the content source can occur through any available carrier at any time of their choosing. Furthermore, the at least one user can select the carrier based upon the device being used at a particular time and/or location.

The system architecture is preferably a thin-client framework. The user needs to only have a telephone or other similarly equipped device. No further processing power, local memory capacity or software is needed to access and interact with the network and/or content delivery service or source to permit the user to access his/her customized content via a variety of devices and/or service providers, as well as at least one of a multiplicity of content sources. All storage, programming logic, intelligent agents and processing power is done at and by the servers of the network.

The network preferably also includes a Voice Response System (VRS) 48 with speech recognition capability that serves as the primary interface when the service is accessed by telephone, either for landline or mobile/cellular telephones, delivering menus and navigation guidance, providing participant information and allowing participants to select content, explore advertising, and to initiate certain financial transactions and account maintenance via an interactive system recognizing natural speech commands. The speech recognition engine is supplemented by a secondary keypad-oriented interface so that the user can opt to navigate the service via touch-tone commands rather than voice commands. Alternatively, Voice over IP (VoIP) may be used by the user to dial the service via their computer and the Internet, while still interfacing with the content delivery service via speech and VRS.

The system preferably uses an expert content management service to deliver desirable content to the user, which the service determines based upon the user inputs, selections, and/or interactions with the system over time, including historical data associated with the user and/or the user's device identity.

The system includes at least one access device equipped with audio capability for receiving and presenting audio content and for transmitting information, navigation and/or selection commands by the user back to the content delivery system for immediate and/or future personalization of the content delivered to the user via the access device. By contrast to prior art audio content receiving devices that are compact and portable, such as radios, the present invention provides for content access devices that receive and transmit information, thereby providing for interactivity between the user and the system, wherein the interactivity permits personalized content delivery, such as audio and/or video, based upon the user's preferences and on their schedule, even though the content is delivered in real time from a remote at least one source, i.e., it is not locally stored on the user's device. Furthermore, the access device can be any type of audio access device, equipped to receive content from the network and transmit user commands. Examples of audio devices include landline telephones 82, cellular and wireless telephones 84, "smart" telephones, Wireless-enabled Personal Digital Assistants (PDA) and Handheld Personal Computers (HPC) 86, satellite phones 88, portable audio jukeboxes 89, and any other devices so equipped to receive and transmit information and content, regardless of the format and protocols used to transmit and receive. Even notebook and desktop computers can be employed to interface with the invention.

Each access device preferably has an interface that permits the user to interact with the content source. The interactive interface can use voice, gesture or touch-based commands from the user. For example, the interface can be a keypad, a touchscreen, microphone, mouse, joystick, and combinations thereof. In a preferred embodiment of the present invention, wireless and wired telephone and PDA devices are preferred access devices for user access to the customized content provided by the user interaction with the at least one content source remote from the user and the user's device. Future devices that may be used with the systems and methods of the present invention include but are not limited to "smart" telephones and related devices that incorporate advanced features, for example, graphical user interfaces capable of providing streaming audio and video to the user. These devices allow users enhanced navigation and search features and offer greater functionality, for example, the ability to see video, including movies, television shows, advertising, and the like.

The present invention thus converts any so-enabled device into a portable jukebox for providing customized content to a user. Even with the minimum features of a basic telephone, the access device allows for interactively engaging remote content in real time. The system access is thus device-independent. That is, the system can be accessed with a variety of devices; access is not limited to a particular type of device nor number of simultaneous users.

The present invention also does not require that special software be running on the user access device to interface with the system; there is no need for web-enablement or web-compatibility. Therefore, no downloading nor installing of software is required.

The system is accessible by the user using the at least one access device. The access means available to the listener depends upon the device the user is using. In the case of a preferred embodiment according to the present invention wherein the access device is a telephone, either conventional wired or wireless, then the user places a telephone call to access the audio content. Alternatively, in the embodiment of the present invention where the access device is a PDA with audio, then the user enters a website via an Internet connection established through the PDA functions.

Thus, although access occurs through an existing network system, access is system-independent, i.e., access depends upon the device being used.

Access is therefore preferably through at least one wireless device, at least one hardline device, and combinations thereof. Access is initiated by at least one telephone call or login, once again depending upon the device being used.

By way of further detailed explanation, by dialing a conventional number associated with the service, a telephone is converted into a device that a user activates and manipulates to connect to the content delivery system, through which the user navigates for audio content by selecting options corresponding to the user interface provided on the telephone, mainly voice and keypad. Supplementing a voice interface, navigation can be done via keystroke, i.e., buttons correspond with selections, and navigation choices, and provide a means for issuing commands and identifying content, etc. Keypad button assignments are dynamic, defined by the current context of the content or being presented.

Nested menus guide users to their content of choice. The service will quickly identify category, genre, artist, as desired. Callers who have previously used the service will be greeted by a more familiar voice and the system will attempt to anticipate interests based on past behavior, possibly returning them to a spot automatically bookmarked, or to a show they are known to monitor. Advanced search and playlist features will also be available.

Listeners navigating through a genre can replay what they like or skip what they do not like—except for advertisements. They can also pause to investigate background information, catalog details, tour dates. Because the system is interactive, the user can immediately purchase or otherwise transact with the music or book or other content, or bookmark it for later review on phone or web.

The system also includes at least one content source. For example, the content source can be any type of content transmitted via radio, for example, music, with custom playlists by genre, artist, style, and the like; audio books and other serialized content; radio talk show replays; sports game replays; TV show replays/movies; new bands auditions; trade journals, news, traffic and the like.

The content source is provided on at least one server. Preferably, the at least one server is connected to the system via the Internet infrastructure and service backbone. In some instances, the servers may be directly connected at the source for archived programming owned by the owners, creators, publishers or licensors of the content offerings. The system gains secure access to the creators'/licensors archives and storage facilities, ensuring no duplication of sensitive content on secondary servers outside their network. In other embodiments, the servers may be connected locally to storage facilities for archives maintained on behalf of content owners; to servers, or to conduit facilities offering the bandwidth suitable to the storage, access and delivery of the archived content.

The system provides for interactivity between the at least one user and the at least one content source. The interactivity includes programmability of the content delivery by the user. For example, specific content types, content delivery scheduling, skip/pause/replay/purchase of content, bookmarking and the like are user-programmable features of the present invention. The user interface preferably also allows the user to obtain detailed information about the particular content being listened to. For example, the interface allows the user to request the artist(s) identity, the content title, content length, catalog of other content by the same artist, biography and the like. Interactivity also facilitates impulse acquisition; a user can instantly order or purchase, depending on what content or advertising so motivates the transaction. The system is scalable to provide this level of individualized, personalized content to multiple users simultaneously.

The system can be used to more effectively audition new audio content, such as bands, comedy, and the like. For example, a content administrator can explicitly invite voting from qualified listeners on the auditioned content and measure navigation behavior during playback. Navigation behavior can also be collected discretely, enabling large sampling of listener behavior which can be helpful not only to the service delivery of suitable content, but to content owners, publishers, market researchers and others interested in rapid surveying and focus grouping of their content and services.

The service creates a new market for audio books and other spoken-word materials. Rather than relying simply on sales of CDs to a fixed audience, the service allows publishers to syndicate titles for playback over the network and earn advertising revenues. Listeners can navigate and bookmark at their own pace. Conventional radio has abandoned serialized content because of the interactivity demands of the audience—time shifting, content review and advance, functions unavailable in the prior art. This invention provides a new venue for serialized content delivered on the users' terms and schedule with no new hardware nor software needed, facilitating introduction and access to spoken word books by a new and potentially much larger audience than exists today.

The service also creates a new residual revenue stream for re-runs of broadcast programs. Radio in particular features many daily programs of wide interest. The programs run for a fixed period at a specific time-of-day and are typically not rebroadcast. Therefore the prior art offers limitations in terms of listeners with compatible schedules and able to hear the complete program—this in turn limits the fees that can be charged for advertising. By contrast, this invention enables listeners to access the archived show at any time, allowing loyal fans opportunity to hear missed portions, and new listeners to experience programming not normally on their schedule. With this ability to offer rebroadcasts, the program creators can access additional advertising revenue via the system for the same show that would normally have been considered "spent" or "depleted". This model applies to daily television programs as well.

The present invention preferably provides a "smart" service or expert content management service that drives desirable content to the user based on the user's usage history. User preferences and interactions are noted and used to drive desirable content automatically. The user no longer needs to continually "change the channel" to receive preferred content. User rejection of content is also noted, such that similar content is not automatically delivered. All content will have an associated file of characteristics which the smart service will use to evaluate and make content selections. Should navigation data indicate a pattern of like or dislike for certain content characteristics (e.g. By skipping or repeating a selection), those definitions get updated to the user profile to ensure future content properly reflects the user taste and interest.

Figure 4:
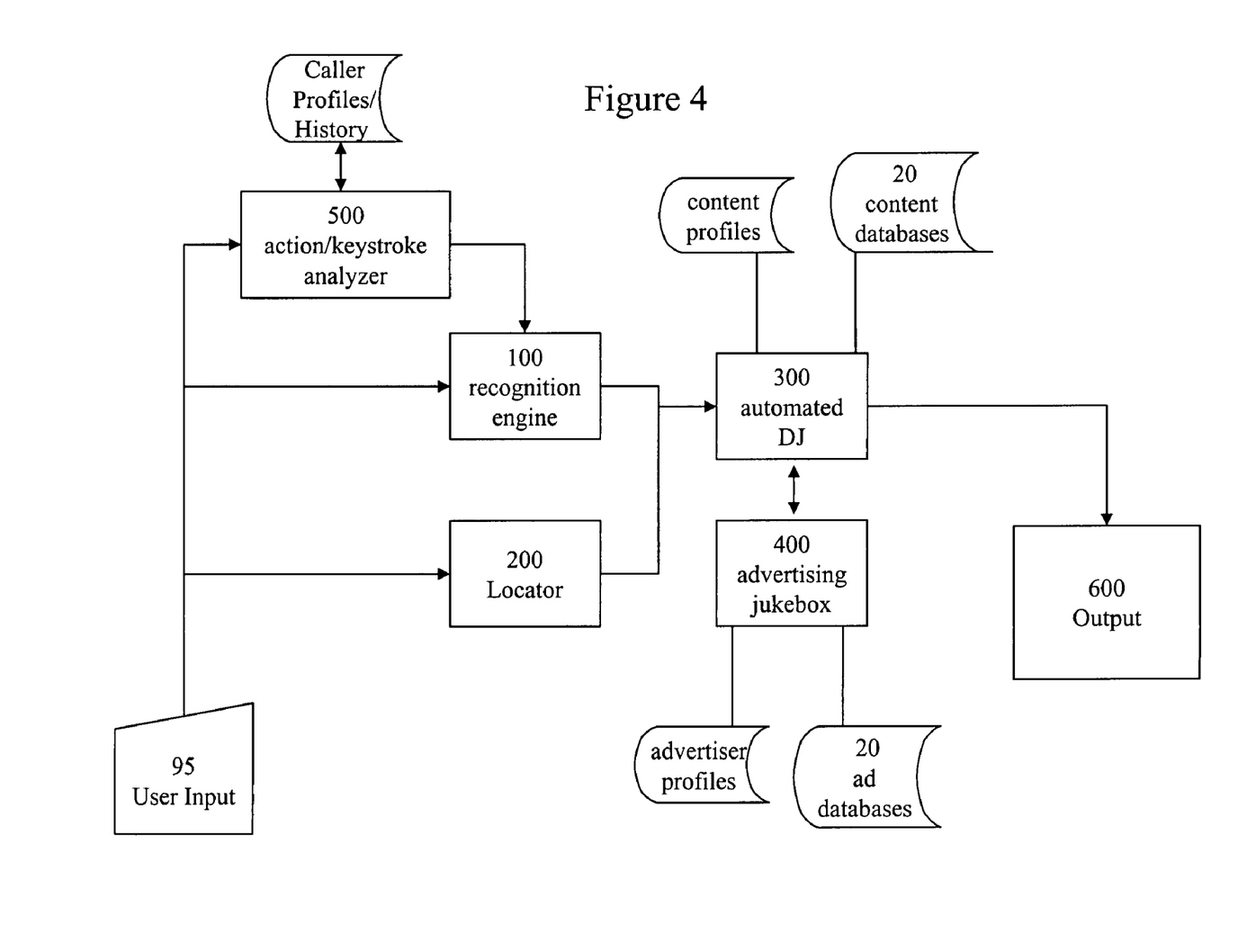
FIG. 4 is a flow diagram of a system according to the present invention.

The expert content management system preferably uses an intelligent agent, or management system, as diagrammed in FIG. 4, that uses user inputs 95 to provide the outputs 600 and includes the following features: a) a recognition engine 100 that uses caller identification to create, store, and retrieve an associated profile based upon calling number, content choices and keystroke behavior; b) a locator 200 that triangulates caller's present location, enabling location-aware services like advertising, tourist information, directions, weather, traffic, and the like; c) an "automated DJ" 300 designed to serve user-selected programming and featuring a simplified user interface which allows quick access to all content on the network; d) an advertising jukebox 400 that selects suitable advertising based upon the aggregated listener data, user profile, location, time of day, and other variables, and combinations thereof; and e) an action/keystroke analyzer 500 that constantly monitors user interactions relative to the content they are receiving, compares with personal history and updates the user profile to enhance and improve future content selection and delivery.

In a preferred embodiment of the present invention, each user tunes in to a personal audio content output that over time becomes increasingly personalized to that user based upon the user's interaction with the system. Significantly, according to the present invention, there is no wide broadcast of the audio content, permitting each user to listen to the audio content of their own choosing, at any time, on their own schedule. Users will be permitted to register with the service; registration offers an opt-in approach for the collection of additional information suitable for further customizing the content and advertising delivered to each user to their individual tastes and needs.

II. Method for Doing Business Using an Audio Content Delivery System

A. Advertising

The present invention includes a method for doing business using an audio content delivery system. The business method includes providing interactive advertising along with the selected content. The interactive advertising can be pinpoint advertising, contextual advertising, and combinations thereof. The interactive advertising can further include providing acquisition transaction ability to the user. The acquisition transaction ability provides the user with the ability to make acquisition transactions through the access device.

The present invention thus provides a method for doing business using a telephone-based audio content delivery system, the method steps including providing an audio content delivery system via telephone carriers and providing interactive advertisement to the at least one user of the access device.

Preferably, the method includes the steps of creating an associated user profile for the at least one user based on user preferences; providing interactive advertisement to the at least one user base on the associated user profile using an expert content management service; and providing acquisition transaction ability to the user through the device.

In the present invention, pinpoint ads target the user based upon the user's profile of known characteristics, content choices and keystroke data. Characteristics in the profile can include situational information, like their calling number and their present location; opt-in users might volunteer additional personal information in their profile for the purpose of improving the learning and decision making of the intelligent agent. Current and past content choices and behavior history, and past advertising interactions combine for a complete profile for the determination of how to pinpoint ads and target content. Advertisers define the profile characteristics of their target audience; the service matches users to the ad profile, and then submits corresponding advertising to these users at appropriate times. The system thus can pre-qualify a listener for a suitable ad.

Each interaction provides more information about the user, improving the targeting of narrow demographics and achieving higher listener receptivity to pre-qualified ads. The advertising jukebox matches the ever more detailed user profile to the profiles of ads it has available to serve. This system pre-qualification of the listener maximizes the likelihood of an ad impression. This one-to-one marketing becomes further refined and accurate as the user continues to interact with the system; this ensures the advertiser a higher impression rate than can be delivered using prior art mediums like radio and television, where ads are broadcast to a wide audience where only a small fraction are actually suitable prospects for business. In the prior art, the advertiser still needs to pay to reach the wide audience despite the narrow target subset desired.

Contextual advertising positions ads that reflect active content. Advertisers associate messages with certain programming, positioning ads relevant to subject matter; thereby facilitating impulse purchasing. With contextual advertising, the ads are directly relevant to the content being delivered. An interview with a movie star could be followed by an ad for their latest DVD. Such ads could even be offered as sub textual to the program—should a listener hear an interview featuring a new book or movie, a click or spoken command could instruct the system to pause the current content and immediately explore the relevant ads on-demand. An ad for a new book could be explored and the book actually purchased by simply issuing the commands appropriate to the transaction. The user can then return to the interview that prompted the transaction, without having missed any of the program.

The navigation capabilities of the service will include not only means for replay, rewind, fast forward, but also the ability to learn more, access associated content, and execute a variety of acquisition transactions. Listeners can bookmark several locations so they can monitor multiple content selections in parallel. The system will also autobookmark current content so that a dropped call or connection can be resumed from the point of disconnection. The system will also feature rich search function to help find content, as well as an indexing system so that listeners can request items by their assigned code. Even ads will be indexed—in this way a user can execute analysis and acquisition transactions on their schedule, rather than only when an ad is being actively served by the jukebox.

The interactive advertising can also be used to perform market research. For example, formal surveys or measuring navigation behavior can be done. The system permits rapid exposure and collection of results and cost-effective targeting of demographics.

The advertising revenue permits the offering of free audio content delivery to the user, the content delivery paid for by advertising revenues. The interactive advertisements are preferably short ads that are selectable by a user to hear longer, more informative ads. The longer ads then preferably lead to a live operator or telesales representative 90 for making a transaction. The ads are provided at predetermined frequencies.

This new system enables new ways to package and sell advertising. For example, as ads are played on an individualized basis, the system can track, price and bill advertisers per exposure—so advertisers pay only for ads that a listener actually heard. Advertising can further be billed based on type of exposure; the quick blurb would be a smaller fee; the more detailed ad, played only at the request of the user, would cost more to reflect a true impression. This is in contrast to the prior art, as in radio, where advertisers are asked to pay based upon statistical estimates of the potential exposures per 1000 listeners regardless of actual impressions made, because radio offers no feedback mechanism to measure success or failure of an ad. The prior art, because it cannot sustain interactivity, cannot provide for the acquisition transaction; the invention enables not only advertising revenue but also the collection of a sales commission suitable to the product or service sold if purchased through the system as the result of an ad.

B. Sales of Products and Services

The present invention thus facilitates the sale and marketing of a variety of products and services, especially entertainment products, such as music, movies, audio books, and the like, but also any advertised goods or services The present invention also facilitates the sales and marketing of location-based services. The locator, which triangulates a caller's present location, allows offering of location-based services, such as shopping, hotel and restaurant guide; local news; traffic reports, driving/walking directions; reservations; event and tourist guide; food delivery; and the like.

The present invention is also preferably used to offer and provide subscription services, such as premium Pay-Per-Listen content; special broadcasts and interviews; improved searching, navigation, and customization; member-specials from advertisers; contests; vertical-interest content such as trade magazines and industry news, mature content; and the like.

The unique interactive environment introduced with this service enables impulse purchase transactions through immediate interaction with advertisements and content. In this manner the service becomes a new retail channel. The present invention preferably uses a variety of acquisition transaction payment means to facilitate the transactions. For example, credit card accounts, prepaid accounts, debit card accounts, micropayment methods, and the like can be used to pay transactions. Sales commissions are preferably charged on transactions. Since the service supports a telesales function and serves as a retail outlet, the service can receive a sales commission typical of other standard telesales and retail operations. And because the service is designed on and facilitated by the Internet, it will be able to serve as an intermediary for the financial end of all of these transactions on behalf of participating vendors, netting a small service fee, also known as a micropayment, on every transaction.

The system preferably includes a telesales center 90, shown in FIG. 3. The telesales center is in communication with the network and allows the user to place an order and/or speak to a live operator. The user can instantly select/purchase a current track or book, explore an artist catalog, buy concert tickets, explore ads without missing the program, and the like.

The present invention thus provides a telephone-carrier-based combined interactive entertainment, advertising, and sales channel that can be accessed by both wired and wireless means.

C. Recycled Broadcast Archives; Spoken Word

Popular daily radio and television programs can earn additional revenue for their creators. The invention enables time-shifting by users who wish to access programming but have schedules in conflict with content of their liking. In this way, creators can earn one revenue stream from their primary broadcast over a conventional medium, and then repackage the same program for presentation with new interactive advertising on the new network.

Similarly, spoken word books, audio books, reach only a narrow market of libraries, long distance commuters and the hearing impaired. The technology allows for the presentation of such serialized content with advertising, allowing new audiences to discover such audio content and supply ad revenues back to the publisher. The exposure to new audiences can also influence the increased sales of featured audio book titles.

D. Market Research

The system can also be used to perform market research. For example, formal surveys or measuring navigation behavior can be done through the system. The system permits rapid exposure and collection of results and cost-effective targeting of demographics. Based upon user preferences, this market research may create new demographic categorization(s), which can serve as a basis for the user to be invited to participate in surveys, screenings, polling, and the like.

Navigation data can quickly inform a music or book publisher on whether further financial investment in a creative vehicle is justified; advertisers can learn quickly which ads succeed, and which fail. Whereas the terrestrial radio industry sells advertising time and results in terms of statistical estimates on the number of listeners possibly tuned in at a given time, this new service will be able to provide hard data on the number of exposures and impressions.

The system can execute more formal polling and surveys. Listeners pre-qualified based on their profiles can be invited to participate, resulting in a potentially more accurate measure of demographics and opinion/behavior.

E. No-download model of entertainment delivery. In one embodiment of the present invention, delivery of audio content, such as music, is in standard analog acoustic format, which means there is no digital image of the song left on the user device from which to make duplicates. The system is therefore not prone to modified use for the purpose of pirating content. This means that content usage is still controlled, yet freely available to users.

Certain modifications and improvements will occur to those skilled in the art upon a reading of the foregoing description. By way of example, video content may also be provided or delivered similarly, depending upon the device being used by the at least one user. Also, video and audio content may be provided together in an integrated and/or coordinated manner, such as video and audio for a movie, a music video, and the like. All modifications and improvements have been deleted herein for the sake of conciseness and readability but are properly within the scope of the following claims.

The invention claimed is:

1. An audio content delivery system for at least one user, comprising:

a network with at least one server in communication with at least one carrier;

at least one audio content source including entertainment content and advertising content;

at least one network access device equipped with audio capability for receiving an audio content in analog format from the network through the carrier and an interface that permits the user to interact with the content source, wherein the audio content is not stored to the network access device;

wherein the at least one network access device and at least one content source are connectable via the network;

wherein the system is accessible by the user using the at least one access device and the system provides for interactivity between the at least one user and the at least one content source, wherein the interactivity includes functions selected from the group containing fast forward, rewind, skip, pause, replay, learn more, and purchase;

wherein the network includes a recognition engine configured to identify a calling number, create a calling number-file based on the calling number, store content choice and keystroke behavior to the calling number-file, and access information contained in the calling number-file when the calling number is recognized by the recognition engine, thereby creating and updating an associated user profile for each user based upon user interactions;

a content profile table, created by the network, to characterize all available content and advertising for improved selection based upon preferences identified by the user profile; and an expert content management service to drive desirable content to the user based on content choice contained in the user's associated profile;

thereby providing an interactive audio entertainment system that allows users to navigate the entertainment and the advertising content and purchase a featured product or service.

2. The system of claim 1, wherein the user can program the system to deliver desired audio content.

3. The system of claim 1, wherein the expert content management service is comprised of a) a recognition engine that uses caller identification to create, store, and retrieve an associated profile based upon calling number, content choices and keystroke behavior;

b) a locator that triangulates caller's present location, thereby enabling location-aware services;

c) an "automated DJ" designed to serve user-selected programming and featuring a simplified user interface which allows quick access to all content on the network;

d) an advertising jukebox that selects suitable advertising based upon the aggregated listener data, location, and time of day; and e) an action/keystroke analyzer that constantly monitors user interactions relative to the content they are receiving, compares with personal history and updates the user profile to enhance and improve future content selection and delivery.

4. The system of claim 1, wherein the at least one carrier is a telephone carrier.

5. The system of claim 3, wherein the at least one carrier is multiple carriers.

6. The system of claim 3, wherein the at least one carrier is a wireless carrier.

7. The system of claim 1, wherein the network access device is selected from the group consisting of landline telephones, cellular and wireless telephones regardless of frequency and protocol of operation, PDAs, portable audio jukeboxes, "smart" telephones, satellite phones, computers and combinations thereof.

8. The system of claim 1, wherein the expert content management service functions as a virtual web browser for the access of audio content via the internet,     thereby allowing access of audio content via the internet without the requirement for a conventional computer or locally stored and controlled web browser environments.

9. The system of claim 8, where the virtual web browser interfaces with the user through audio commands including voice and touchtone commands, thereby allowing for interface without the need for a display, memory, CPU or qwerty keyboard.

10. The system of claim 1, wherein the network is configured to bookmark content choices stored in the calling number-file.

\* \* \* \* \*

UNITED STATES PATENT AND TRADEMARK OFFICE
CERTIFICATE OF CORRECTION

PATENT NO. : 7,567,846 B2  Page 1 of 1
APPLICATION NO. : 10/949514
DATED : July 28, 2009
INVENTOR(S) : Robert S. Sztybel It is certified that error appears in the above-identified patent and that said Letters Patent is hereby corrected as shown below:

In Column 10, Line 29, there should be a (.) at the end of the sentence.

In Column 11, Line 17, hearing impaired should be "visually impaired.".

Signed and Sealed this

First Day of June, 2010

David J. Kappos
*Director of the United States Patent and Trademark Office*